(12) United States Patent
Lemire

(10) Patent No.: US 7,726,926 B2
(45) Date of Patent: Jun. 1, 2010

(54) SELF-DRILLING AND SLOTTING FASTENER SYSTEM

(76) Inventor: Robert James Lemire, P.O. Box 299, Kings Park, NY (US) 11754

( * ) Notice: Subject to any disclaimer, the term of this patent is extended or adjusted under 35 U.S.C. 154(b) by 293 days.

(21) Appl. No.: 11/507,990

(22) Filed: Aug. 23, 2006

(65) Prior Publication Data

US 2008/0050197 A1    Feb. 28, 2008

(51) Int. Cl.
    *F16B 21/00*    (2006.01)
(52) U.S. Cl. .................. 411/340; 411/999; 411/344
(58) Field of Classification Search ................ 411/340, 411/344–349, 999
    See application file for complete search history.

(56) References Cited

U.S. PATENT DOCUMENTS 4,183,386 A * 1/1980 Brown ..................... 411/176
4,196,883 A * 4/1980 Einhorn et al. ............. 248/546
5,044,854 A * 9/1991 Oh ........................... 411/344

* cited by examiner

Primary Examiner—Gary Estremsky
(74) Attorney, Agent, or Firm—Robert J. Lemire

(57) ABSTRACT

A flat nut is provided with a threadlike retainer cord and structure for self-drilling and slotting a wall to provide a suitable hole for insertion of the nut, and a screw to be threaded into the nut. The retainer cord provides for positioning the nut on the back side of the wall. The nut has an elongated drilling point for making a hole and serrated teeth along an elongated side for making horizontal slots on each side of the hole to accommodate the full width of the nut. The arrangement provides a simple way to fasten objects onto a wall without access to both sides.

2 Claims, 5 Drawing Sheets

SELF-DRILLING AND SLOTTING FASTENER SYSTEM

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to a blind fastening system for holding objects onto a modern gypsum wall. It is composed of a self-drilling and slotting fastener nut, a thin retainer cord, and a screw. The fastener nut is inserted through a slotted hole in a surface and held in alignment with the retainer cord for the insertion of a screw for fastening an object onto the surface. The fastener nut has a threaded hole and on the middle of the wide side and an elongated side. The elongated side is a little wider than the width of the threaded hole and has a drilling end. This elongated end is longer than the thickness of the wall and is used to drill a hole through the wall by manually turning the fastener nut. The elongated end also has a serrated side section for making slots on each side of the hole to provide a clean slotted hole in the wall for the full width of the fastener nut.

There are numerous fastening devices that all try to maximize the holding power the fastener exerts onto the back of the surface it is placed onto. The holding power is directly proportional to the amount of surface area that the fastener has on the inside face of the surface. The size of the opening in the surface needed for the insertion of the fastener is another factor in determining the holding power of a fastener. The smaller the hole the less damage the surface has and the stronger the surface is. It is of primary importance that a clean hole be made in the wall for the fastener to achieve maximum holding power. Many products attempt to achieve this, however they quite often fall short.

Some products have a flat wedge shaped fastener being driven through a wall and being used as a fastener. The problem with this device is that the back of the wall gets "blown-out". That is, the inside portion of the wall gets damaged and does not provide a clean flat surface for the fastener to rest against. In addition to the back surface the material between the front and back face of the wall gets damaged. Another problem is the insertion of the screw through the hole made by the wedge. The width of the screw is usually greater than the width of the wedge and also causes the back of the wall to become "blown-out". To avoid that, the width of the wedge would have to match the width of the screw, as shown on FIGS. 6 & 7. Having such a wide wedge only compounds the "blow-out" problem.

Other devices show a fastener that makes use of a flexible cord used to align a fastener nut with a matting screw. This type of system requires that a hole be drilled through the wall by a standard tool. The width of the fastener nut is also limited by the size of the hole made in the wall.

The fastening system described in this application maximizes the holding power by having almost the entire flat surface of the fastener against the inside face of the surface.

In addition to having a maximum of holding power and minimum wall damage, the system is simple to use and inexpensive to manufacture.

BRIEF SUMMARY OF THE INVENTION

In accordance with the preferred embodiment of the present invention there is provided a blind fastening system composed of a self-drilling and slotting threaded nut, a thin and flexible retainer cord, and a screw.

The pointed end of the elongated side of the fastener nut is used to manually drill a hole in the gypsum board. After the center hole has been made the serrated portion of the elongated side is used to make opposing slots that are wide enough to accommodate the full width of the fastener nut. This creates a clean slotted hole without significant damage to the interior or back surface of the wall. This is accomplished without the need for a drill or a saw blade since each fastener nut has a built-in drill and saw.

After the slotted hole has been made in the wall the retaining cord is attached to the fastener nut and it is inserted through that hole so that the retainer cord is holding the fastener nut and has one end on the outside of the wall. The other end of the retainer cord is then inserted through the object being affixed to the wall and the fastener nut. The retainer cord is then pulled to align the fastener nut with the screw. Turning the screw secures the screw into the fastener nut on the inside of the wall.

The amount of holding capability of this fastener nut is a function of the surface area of the nut and the strength of the surface it is being used on. For gypsum walls the length and width of the fastener nut will be a deciding factor along with the thickness of the wall. This fastener can be used with all gypsum walls, and the holding power will differ based on the wall thickness.

BRIEF DESCRIPTION OF THE DRAWINGS

These as well as other features of the present invention, will become more apparent upon reference to the drawings wherein.

DETAILED DESCRIPTION OF THE INVENTION

Figure 1:
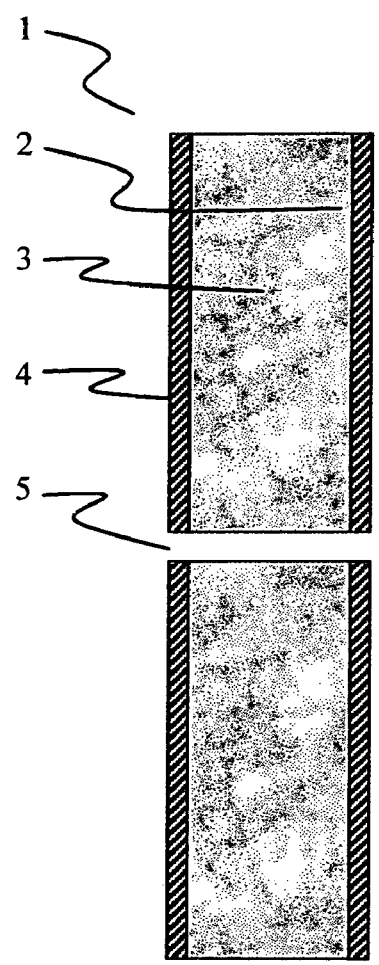
FIG. 1 is a cross sectional view of a drilled hole in a gypsum wall

With reference to the drawings in which like reference characters designate like or corresponding parts throughout the various views and with particular reference to FIG. 1, which is a cross sectional view of a drilled hole 5 in a gypsum wall 1 where the outside and inside faces 2 and 4 are covering the gypsum material 3.

Figure 2:
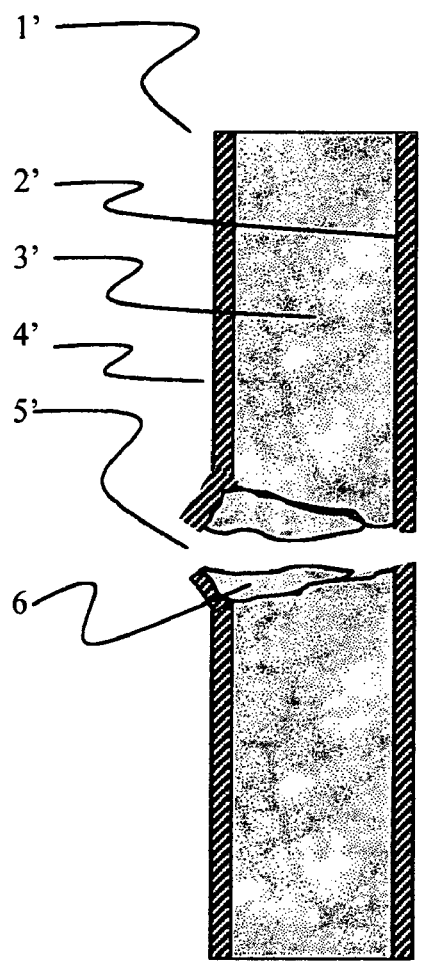
FIG. 2 is a cross sectional view of a hole punched through a gypsum wall

FIG. 2 is a cross sectional view of a punched hole 5' in a gypsum wall 1' where the outside and inside faces 2' and 4' are covering the gypsum material 3'. The punching process may make a clean hole on the outside face 2', however, it damages the inner gypsum core 6 and tears the inner face 4'. This action weakens the entire area around this hole.

Figure 3:
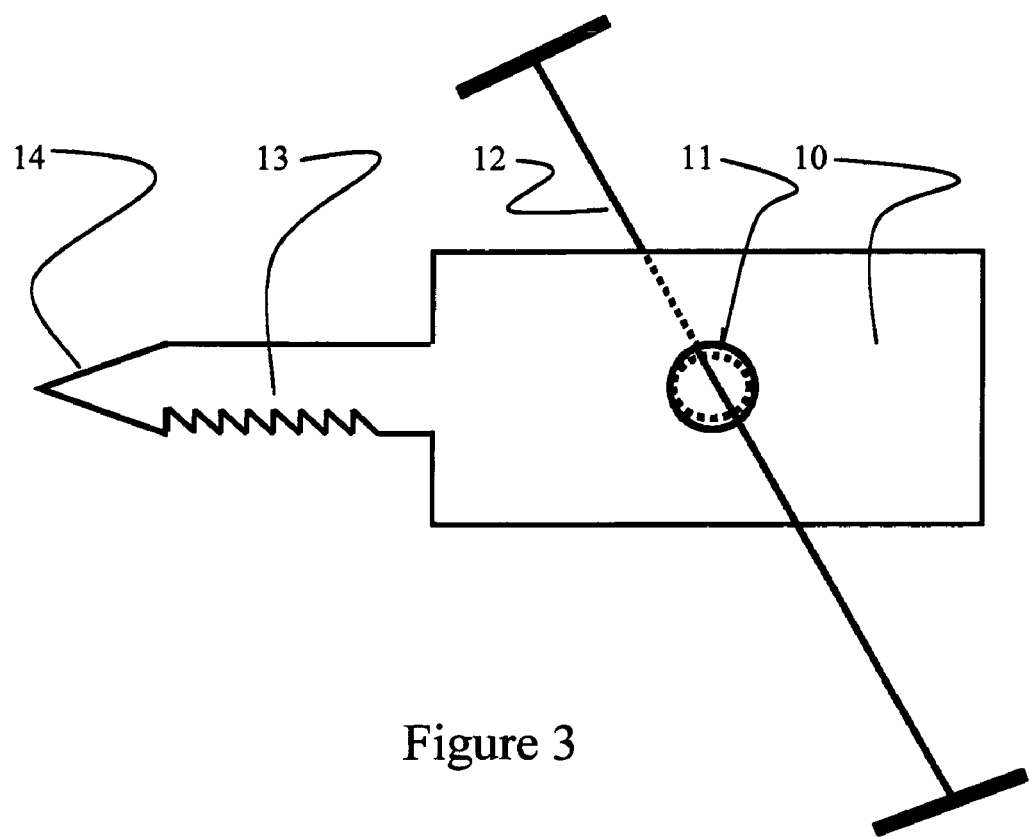
FIG. 3 is a plan view of the self-drilling and slotting fastener nut with a retaining cord through the threaded hole

FIG. 3 is a plan view of the self-drilling and slotting fastener nut 10 composed of a thin metal stamping with a flexible retaining cord 12 through the threaded hole 11. The flexible retaining cord 12 has knotted or extended ends. Fastener nut 10 also has an elongated side with drilling point 14 at its end and a serrated side 13. The elongated side is long enough to penetrate the thickness of the wall 1 so that its serrated side 13 extends beyond the inner face 4 of the wall and acts like a saw for making clean slots in the wall.

Figure 4:
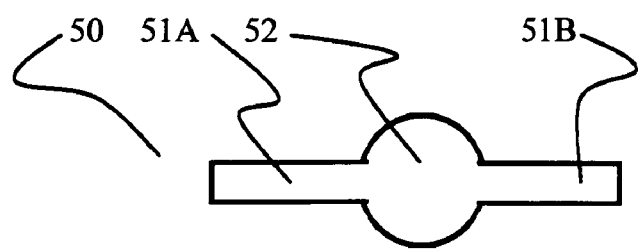
FIG. 4 is a plan view of the slotted hole made with the elongated section of the fastener nut

FIG. 4 is a plan view of the slotted hole 50 produced by manually using the fastener nut 10 as a drill and saw to form it. Turning the pointed end 14 of fastener nut 10 into a gypsum wall 1 drills the clean circular hole 52 through the wall 1. After hole 52 is through the wall the serrated side 13 of the fastener nut 10 is used to make slots 51A & 51B on each side of the center hole 52. After the slotted hole 50 is made the fastener nut 10 with the retaining cord 12 is manually pushed through the wall 1. The retaining cord 12 keeps the fastener nut 10 from falling.

Figure 5:
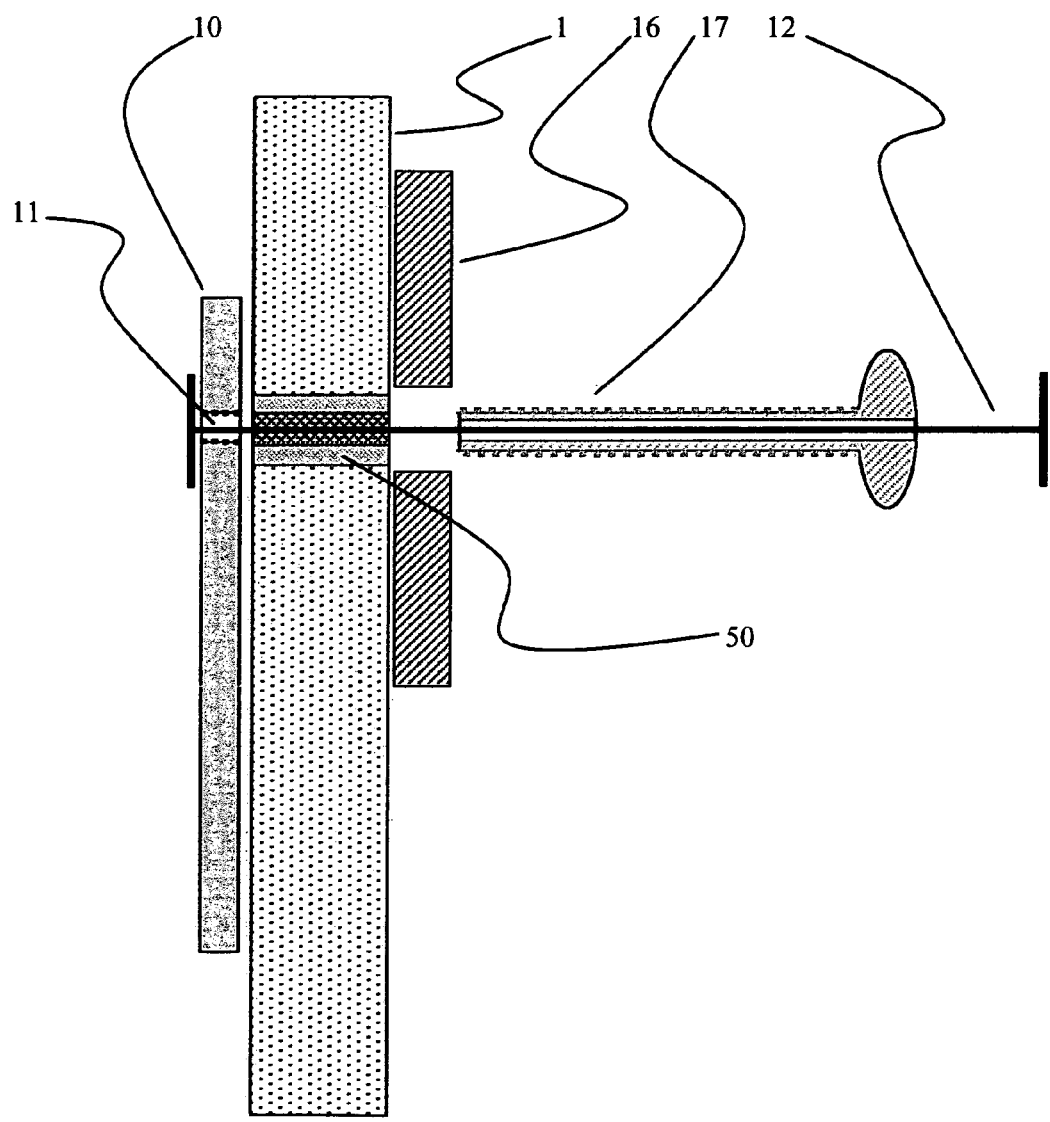
FIG. 5 is a sectional view of the fastener nut held in position with the cord through the threaded hole and hollow screw about to hold an object onto the wall

FIG. 5 is sectional view of the fastener nut 10 held in position with the retaining cord 12 through the threaded hole 11, slotted hole 50 in wall 1, object 16, and hollow screw 17. The ends of cord 12 fold over so that they can be inserted through the various openings. Pulling on cord 12 aligns the hollow screw 17 with the threaded hole 11 so it can be engaged and hold object 16 securely in place.

Figure 6:
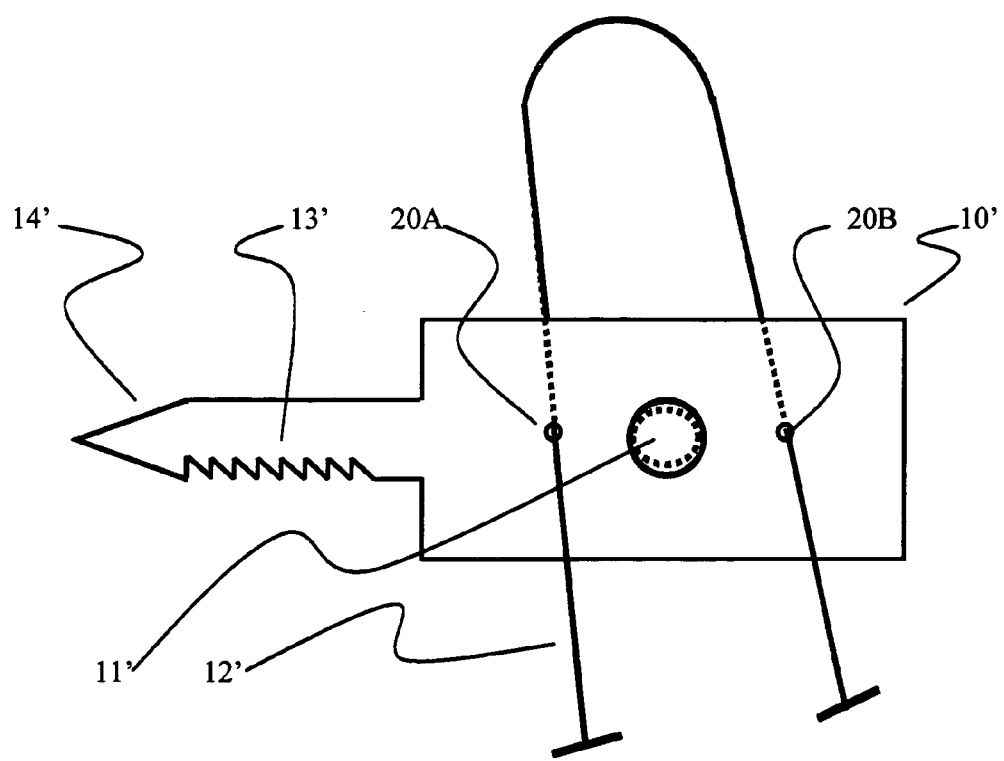
FIG. 6 is a plan view of the self-drilling and slotting fastener nut with a retaining cord through the holes on each side of the threaded hole

FIG. 6 is a plan view of the self-drilling and slotting fastener nut 10' composed of a thin metal stamping with a retaining cord 12' through holes 20A & 20B on each side of threaded hole 11'. It also shows the elongated side with drilling point 14' and serrated side 13'.

Figure 7:
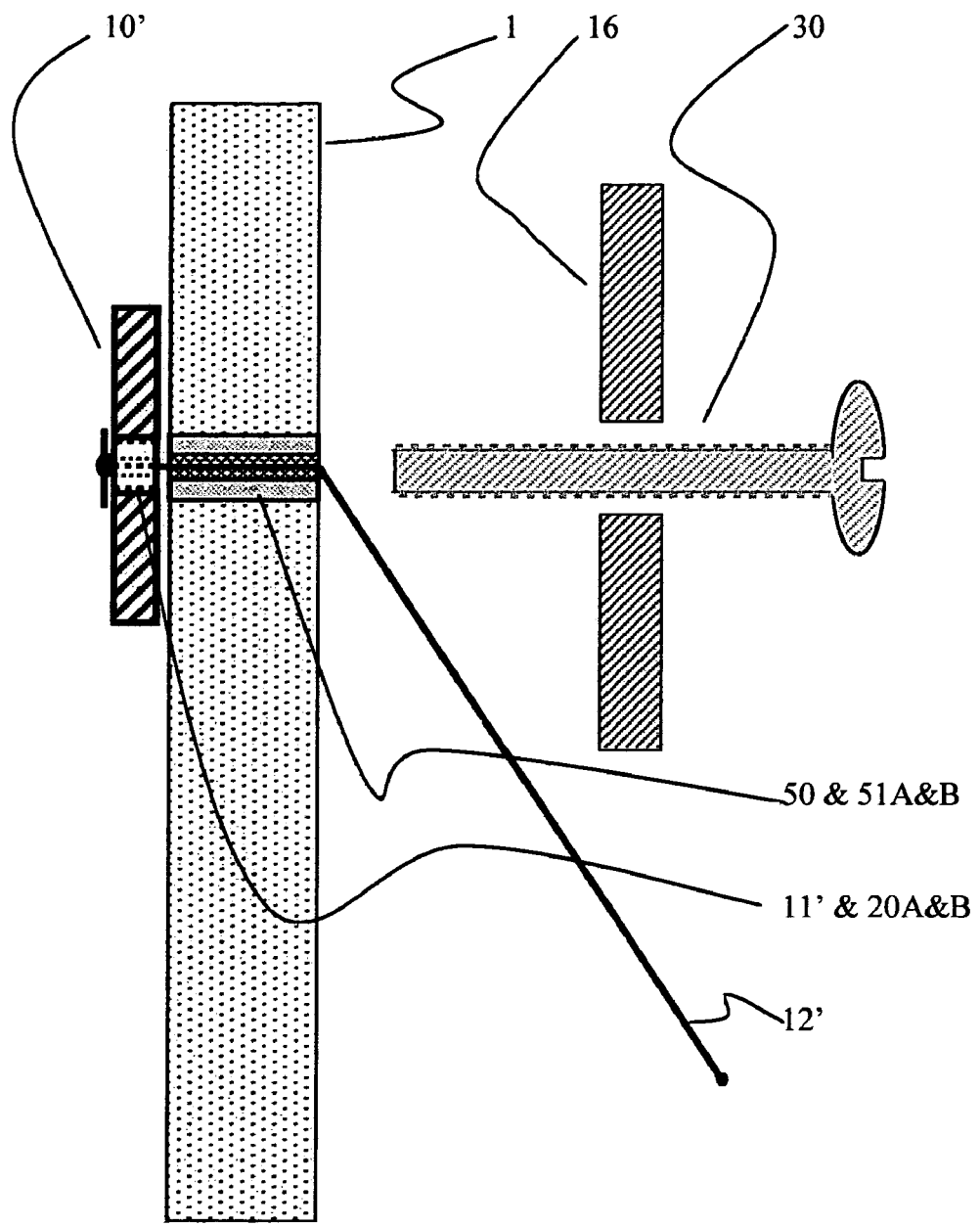
FIG. 7 is a sectional view of the fastener nut held in position with the retainer cord through the holes one each side of the threaded hole and a standard screw about to hold an object onto the wall

FIG. 7 is sectional view of the fastener nut 10' held in position with the cord 12' through the holes 20 A & B, slotted sections 51A & 51B in slotted hole 50 in wall 1, with standard screw 30 through object 16 in position to engage threaded hole 11'. Pulling on cord 12' aligns the threaded hole 11' so it can become engaged with screw 30 and hold object 16 securely in place.

Additional modifications and improvements of the present invention may also be apparent to those of ordinary skill in the art. Thus, the particular combination of parts described and illustrated herein is intended to represent only a certain embodiment of the present invention, and is not intended to serve as limitations of alternative devices within the spirit and scope of the invention.

What is claimed is:

1. A blind fastening system for gypsum walls composed of a thin metal fastening nut, a flexible retaining cord, and a fastening screw whereby the fastening nut includes means for making a clean slotted circular hole, including at least one radially extending slot in said wall, and when in use, is held flush against the inside of said wall by the retaining cord so that the fastening screw can mate with the nut and hold an object onto said wall;

and further comprising:
  a. a thin metal fastening nut having a threaded hole and an elongated side that is wider than said threaded hole, wherein said elongated side has a serrated side and a drilling point; whereby said elongated side is of sufficient length to penetrate a wall and make a circular hole by manually turning the fastening nut with the drilling point against the wall, and using the serrated side to cut slots on each side of the hole for the passage of the full width of the fastening nut;
  b. a retaining cord having elongated ends, with one end through said threaded hole that retains the fastener nut when inserted through the slotted hole in the wall, and the other end goes through the wall, a hole in the object being fastened, and a hollow screw;
  c. a hollow screw that travels down the retaining cord and meets the threads of the threaded hole in the fastener nut;
  whereas, pulling the retainer cord allows the hollow screw to go down the cord and mesh with the threaded hole thereby holding the object securely onto the wall.

2. The blind fastening system of claim 1 and further comprising:
  a. a thin metal fastening nut having a threaded hole and an elongated side that is wider than said threaded hole, wherein said elongated side has a serrated side and a drilling point; whereby said elongated side is of sufficient length to penetrate a wall and make a circular hole by manually turning the fastening nut with the drilling point against the wall, and using the serrated side to cut slots on each side of the hole for the passage of the full width of the fastening nut, and is further configured to have small retaining holes on each side of the threaded hole for the passage of a retaining cord;
  b. a retaining cord having elongated ends, with its ends through said retaining holes so that the fastener nut is held in position when inserted through the slotted hole in the wall, and having the looped end extending through the wall;
  c. a standard screw through a hole in the object being fastened that meets the threads of the threaded hole in the fastener nut when the retaining cord is pulled to align the threaded hole with the center of the slotted hole in the wall;
  whereas, the screw is able to mesh with the threaded hole thereby holding the object securely onto the wall.

\* \* \* \* \*